United States Patent
Shetty et al.

(10) Patent No.: US 7,747,627 B1
(45) Date of Patent: Jun. 29, 2010

(54) METHOD AND SYSTEM FOR FILE RETRIEVAL USING IMAGE VIRTUAL FILE SYSTEM

(75) Inventors: Vignesh Dayanand Shetty, Bangalore (IN); Gary Gitelson, San Jose, CA (US); Navneet Agarwal, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 314 days.

(21) Appl. No.: 11/299,008

(22) Filed: Dec. 9, 2005

(51) Int. Cl.
*G06F 7/00* (2006.01)

(52) U.S. Cl. .................. 707/741; 711/100

(58) Field of Classification Search ............. 707/741; 711/3, 6, 100, 113, 118, 203, 205, 221; 714/5, 714/29, 42; 999/1
See application file for complete search history.

(56) References Cited

U.S. PATENT DOCUMENTS

| | | | | |
|---|---|---|---|---|
| 5,577,224 | A * | 11/1996 | DeWitt et al. ............. | 711/118 |
| 5,603,003 | A * | 2/1997 | Akizawa et al. ........... | 711/114 |
| 6,088,767 | A * | 7/2000 | Dan et al. ................. | 711/129 |
| 6,253,309 | B1 * | 6/2001 | Mahalingaiah ............ | 712/213 |
| 6,820,085 | B2 * | 11/2004 | Nishizawa et al. ........ | 707/10 |
| 6,985,914 | B2 * | 1/2006 | Venkatesh et al. ......... | 707/200 |
| 7,243,089 | B2 * | 7/2007 | Becker-Szendy et al. .. | 707/1 |
| 2002/0147611 | A1 * | 10/2002 | Greene et al. ............. | 705/1 |
| 2002/0165727 | A1 * | 11/2002 | Greene et al. ............. | 705/1 |
| 2002/0184221 | A1 * | 12/2002 | Ahmad et al. ............. | 707/10 |
| 2003/0158836 | A1 * | 8/2003 | Venkatesh et al. ......... | 707/1 |
| 2005/0080992 | A1 * | 4/2005 | Massey et al. ............. | 711/114 |
| 2005/0114291 | A1 * | 5/2005 | Becker-Szendy et al. .. | 707/1 |
| 2005/0120025 | A1 * | 6/2005 | Rodriguez et al. ......... | 707/10 |
| 2006/0020646 | A1 * | 1/2006 | Tee et al. ................. | 707/205 |
| 2006/0036570 | A1 * | 2/2006 | Schaefer et al. ........... | 707/1 |
| 2006/0143396 | A1 * | 6/2006 | Cabot ...................... | 711/134 |
| 2006/0155674 | A1 * | 7/2006 | Traut et al. ............... | 707/2 |
| 2006/0212350 | A1 * | 9/2006 | Ellis et al. ................ | 705/14 |

FOREIGN PATENT DOCUMENTS

WO    WO 9518407 A1 *   7/1995

OTHER PUBLICATIONS

Katz, Randy H., "High-Performance Network and Channel-Based Storage", Proceedings of the IEEE, Aug. 1992, 24 pages, vol. 80, Issue 8.

* cited by examiner

*Primary Examiner*—Hung Q Pham
*Assistant Examiner*—Hubert Cheung
(74) *Attorney, Agent, or Firm*—Trellis IP Law Group, PC (57) ABSTRACT

Methods and systems have been provided that allow a user to access a file in a computational device. The location of the file is made transparent to the user. The request for the file includes the filename. The filename is mapped to the location of the file in the computational device. The file is returned if it is present in the cache of the computational device. Otherwise, the file is retrieved from a storage device. The cached files are, deleted from the cache on the basis of a policy-based-cache-deletion mechanism.

19 Claims, 9 Drawing Sheets

METHOD AND SYSTEM FOR FILE RETRIEVAL USING IMAGE VIRTUAL FILE SYSTEM

BACKGROUND OF THE INVENTION

1. Field of Invention

Embodiments of the invention relate, in general, to file systems in a computational device. More specifically, embodiments of the invention relate to methods and systems for accessing a file from a memory or a local device in the computational device.

2. Description of the Background Art

A typical file system stores and organizes computer files and data in a computational device. The file system records the location of all the files and directories present in, for example, the hard disk, CD-ROM and other data storage devices. Moreover, the typical file system helps a user to manipulate, navigate, access and retrieve desired files from a computational device.

Conventionally, various file systems are used to access a file from any location in a Computational device. One conventional file system is a LINUX™-based, buffered file system. This file system requires virtual memory (VM) support to function. Virtual Memory is a computer design feature that permits software to use more main memory than the computer physically possesses. In the VM-based file system, VM buffers disk pages and files. Whenever a user wants to access a file, it is checked if the file is present in a buffer cache. The file is fetched from the disk if it is not present in the buffer cache. The files are automatically stored in the buffer cache and are deleted from it on the basis of a Least Recently Used (LRU)-based mechanism. According to the LRU-based mechanism, a file is deleted from the buffer cache when it is marked least recently used among a given set of files. This can sometimes lead to the deletion of files, which might be needed after the file has been deleted.

Moreover, the VM-based file system is a disk-block-based system, therefore, the user needs to know the location of the file in the computational device in order to access it. Therefore, the location of the file is not transparent to the user. This can make accessing a file difficult and time-consuming for the user.

DETAILED DESCRIPTION OF EMBODIMENTS OF THE INVENTION

Various embodiments of the invention provide methods, systems, and computer-readable media to retrieve files from memory or user configurable storage archive using an Image Virtual File System (IVFS). In the description herein for embodiments of the invention, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the invention.

Figure 1:
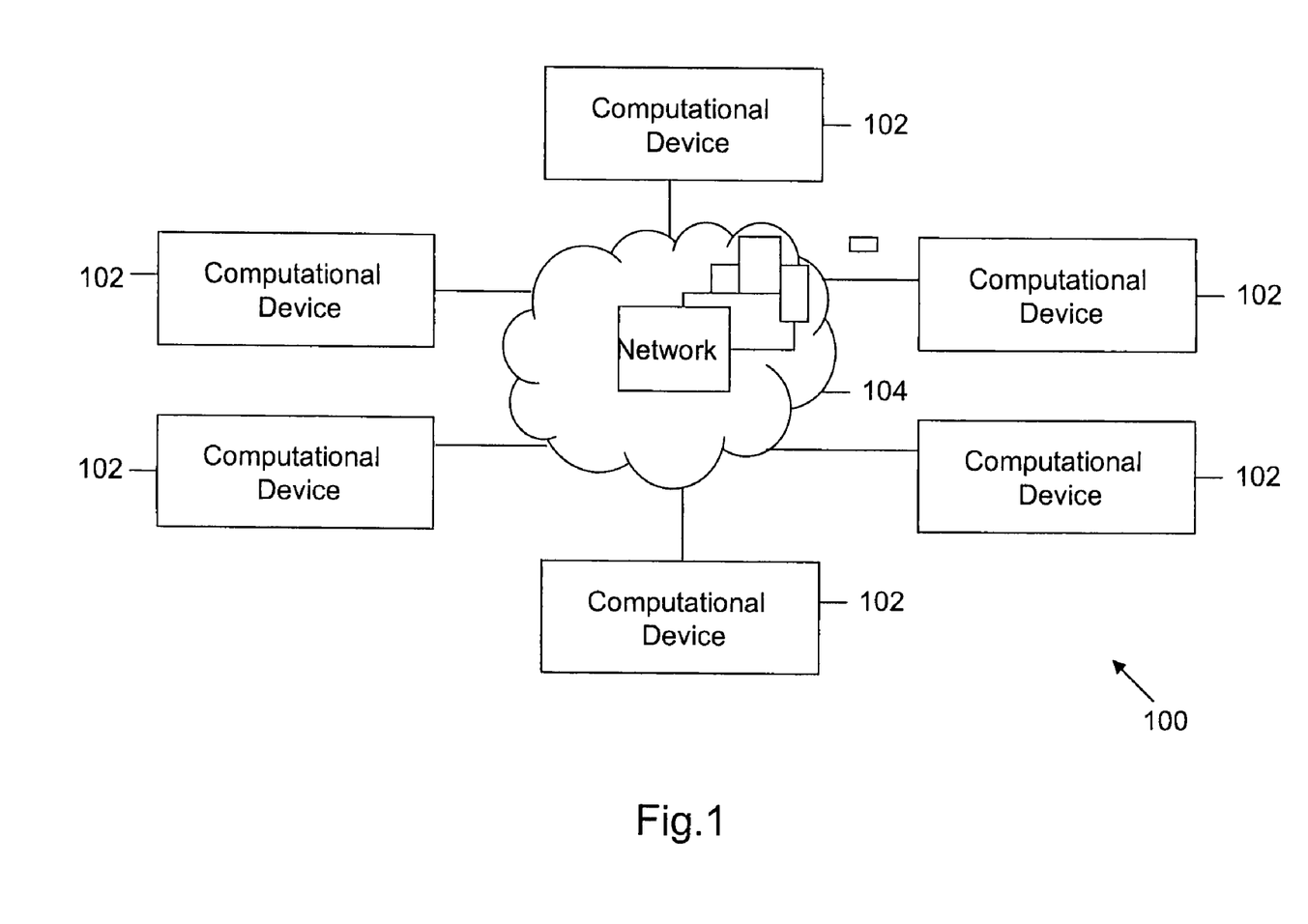
FIG. 1 illustrates an environment wherein various embodiments of the invention can be performed.

Referring now to the drawings more particularly by reference numbers; FIG. 1 illustrates an environment 100 wherein various embodiments of the invention can be performed. Environment 100 includes computational devices 102 that are connected to each other through a network 104. Examples of computational devices 102 include, but are not limited to, computers, mobile devices and Personal Digital Assistants (PDAs). Computational devices 102 can be connected in various topologies, such as ring, tree, star, bus and mesh. Computational devices 102 share resources with each other in the form of files. The resources can be data, computational services or a combination of data and computational services. A collection of resources is referred to herein as a file. Computational devices 102 receive and transmit files via network 104. Network 104 can be a wired or a wireless network.

Figure 2:
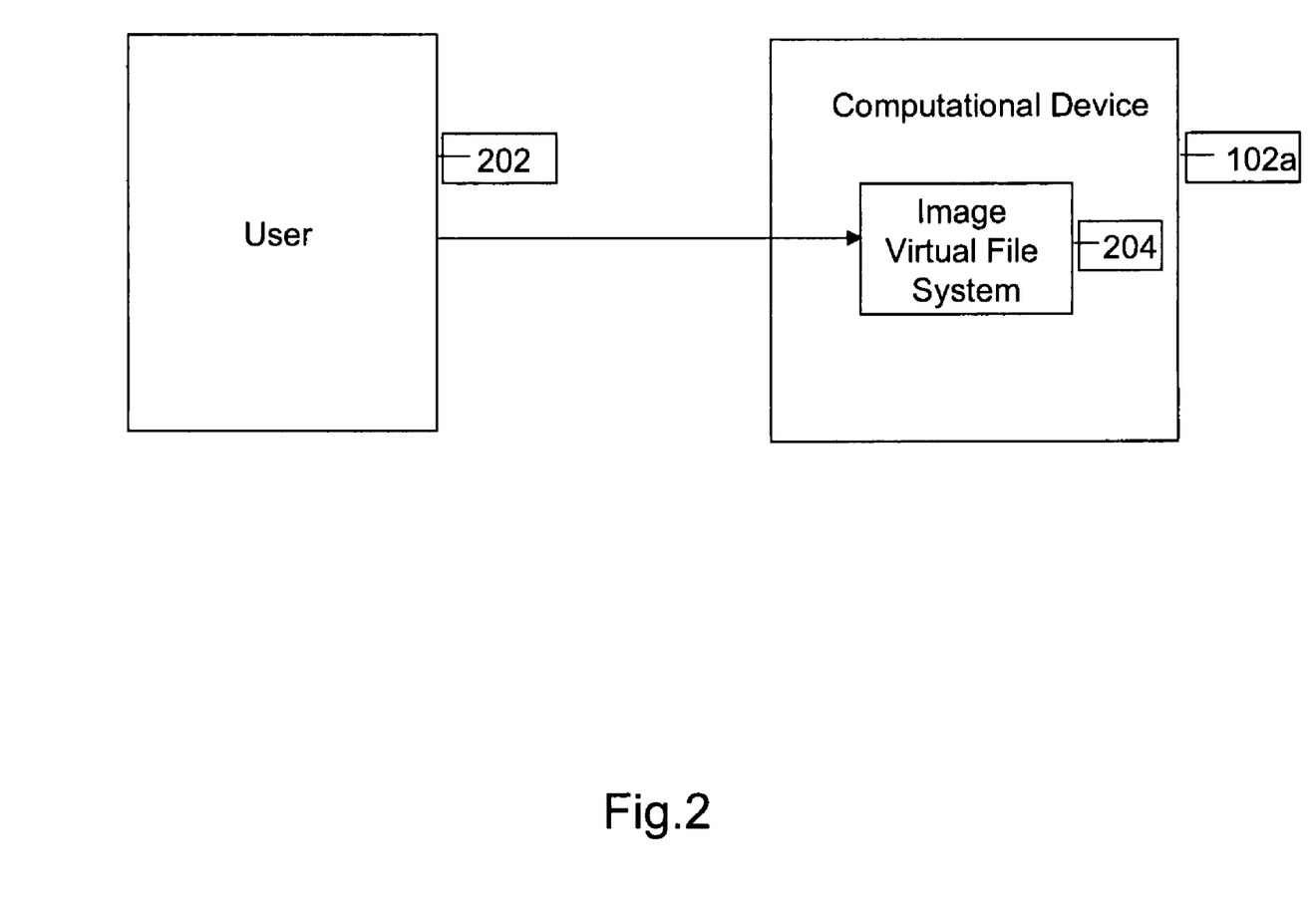
FIG. 2 illustrates a user interacting with a computational device, in accordance with various embodiments of the invention.

FIG. 2 illustrates a user 202 interacting with a computational device 102a, in accordance with various embodiments of the invention. Computational device 102a, hereinafter referred to as a receiving computational device, receives a request for a file, from user 202. Examples of the requested file include, but are not limited to, Microcode, Tool Command Language (TCL) scripts and code-signing files. The receiving computational device comprises an Image Virtual File System (IVFS) 204 that serves the requested file to user 202. User 202 may be an individual or it may be another computational device issuing a request for a file. IVFS 204 is a file system that stores and organizes files and data in the receiving computational device. IVFS 204 can work independently of virtual memory support. Moreover, IVFS 204 records the location of all the files and directories present in, for example, the hard disk, CD-ROM and other data storage devices in the receiving computational device. In addition, IVFS 204 allows user 202 to manipulate, navigate, access and retrieve the requested files from the receiving computational device without the need to know the exact location of the requested files in the receiving computational device. Therefore, the location of the requested file is transparent to user 202.

Figure 3:
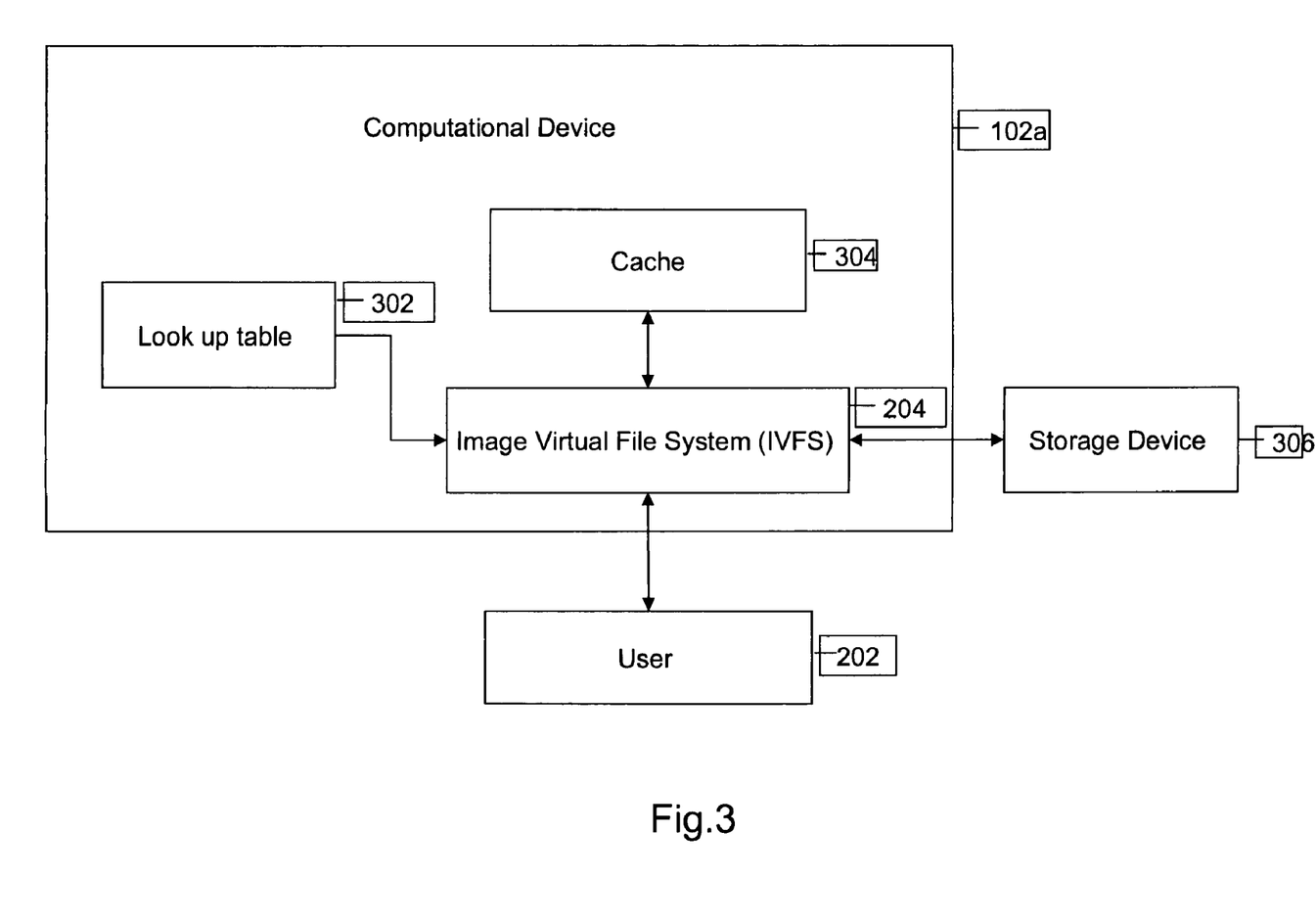
FIG. 3 illustrates various elements used for retrieving a file, in accordance with various embodiments of the invention.

FIG. 3 illustrates various elements used for retrieving a file, in accordance with various embodiments of the invention. As stated earlier, user 202 can access the requested file from the receiving computational device by using IVFS 204, while the exact location of the requested file is transparent to user 202. IVFS 204 can receive the request for the requested file in the form of a filename. Further, IVFS 204 can map the filename to a location of the requested file in the receiving computational device with the help of a look-up table 302. The requested file can be located in a cache 304 of the receiving computational device or in a storage device 306. Cache 304 is a part of the memory of the receiving computational device. Cache 304 temporarily stores files for an easy and quick access. Storage device 306 can be included in the memory of the receiving computational device or a local device attached to the receiving computational device. In an embodiment of the invention, storage device 306 can be included in a computational device different from computational devices 102 and attached to the receiving computational device through network 104. Moreover, storage device 306 can be included in a local device attached to or in the memory of a computational device different from computational devices 102 that is attached to the receiving computational device. Therefore, the requested file can be retrieved either from cache 304 or storage device 306 when requested by user 202. Storage device 306 may comprise magnetic or optical storage such as is commonly used to store computer data and files. By way of example, storage device 306 may be a storage area network, a magnetic tape drive, a magnetic disk drive or non-volatile semiconductor memory.

Figure 4:
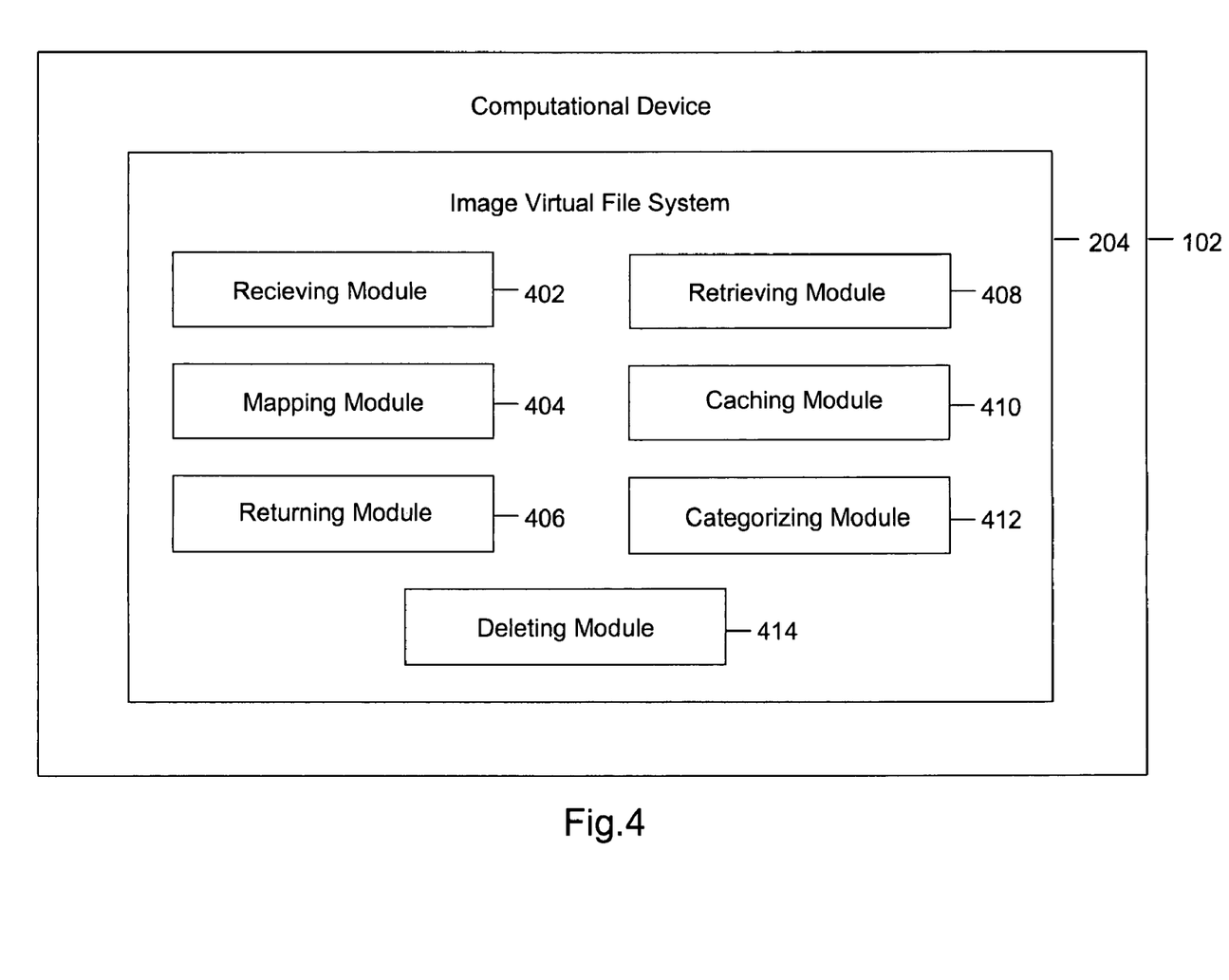
FIG. 4 illustrates various modules present in an Image Virtual File System (IVFS) of the receiving computational device, in accordance with various embodiments of the invention.

FIG. 4 illustrates various modules present in IVFS 204 of the receiving computational device, in accordance with various embodiments of the invention. Each computational device from computational devices 102 includes IVFS 204. IVFS 204 includes a receiving module 402, a mapping module 404, a returning module 406, a retrieving module 408, a caching module 410, a categorizing module 412 and a deleting module 414. Receiving module 402 of the receiving computational device receives the request for the requested file from user 202. Mapping module 404 maps the filename to the location of the requested file in the requesting computational device. The mapping is performed with the help of look-up table 302. Look-up table 302 represents a table that includes the filenames of the files present in the receiving computational device along with their locations in either cache 304 or storage device 306. Returning module 406 returns the requested file from cache 304 if the requested file is present in cache 304. If the requested file is not present in cache 304, then retrieving module 408 of the receiving computational device can retrieve the requested file from storage device 306.

Caching module 410 saves the retrieved files, hereinafter referred to as the cached files, in cache 304 of the receiving computational device. Caching module 410 can save the retrieved files in either a compressed or a decompressed form. Therefore, cache 304 includes only those files that have been requested by user 202. The cached files and the available space in cache 304 have a significant impact on the boot-up time of computational devices 102. Therefore, there may be a significant reduction in the boot-up time of computational devices 102. In an embodiment of the invention, many real time mobile devices such as mobile phones can also experience a significant reduction in the boot-up time. Moreover, as files are returned from cache 304 of the receiving computational device, the time taken by the receiving computational device to serve the request can also be reduced.

Categorizing module 412 categorizes the cached files in different categories. The details regarding different categories are described later with reference to FIG. 7. These categories can be used by deleting module 414 to delete the cached files. Deleting module 414 deletes the cached files on the basis of a policy-based-cache-deletion mechanism. The policy-based-cache-deletion mechanism deletes the cached files on the basis of the category assigned to them by categorizing module 412. In accordance with an embodiment of the invention, the policy-based-cache-deletion mechanism is defined by user 202. Further, user 202 can define the categories in which categorizing module 412 categorizes the files.

Figure 5:
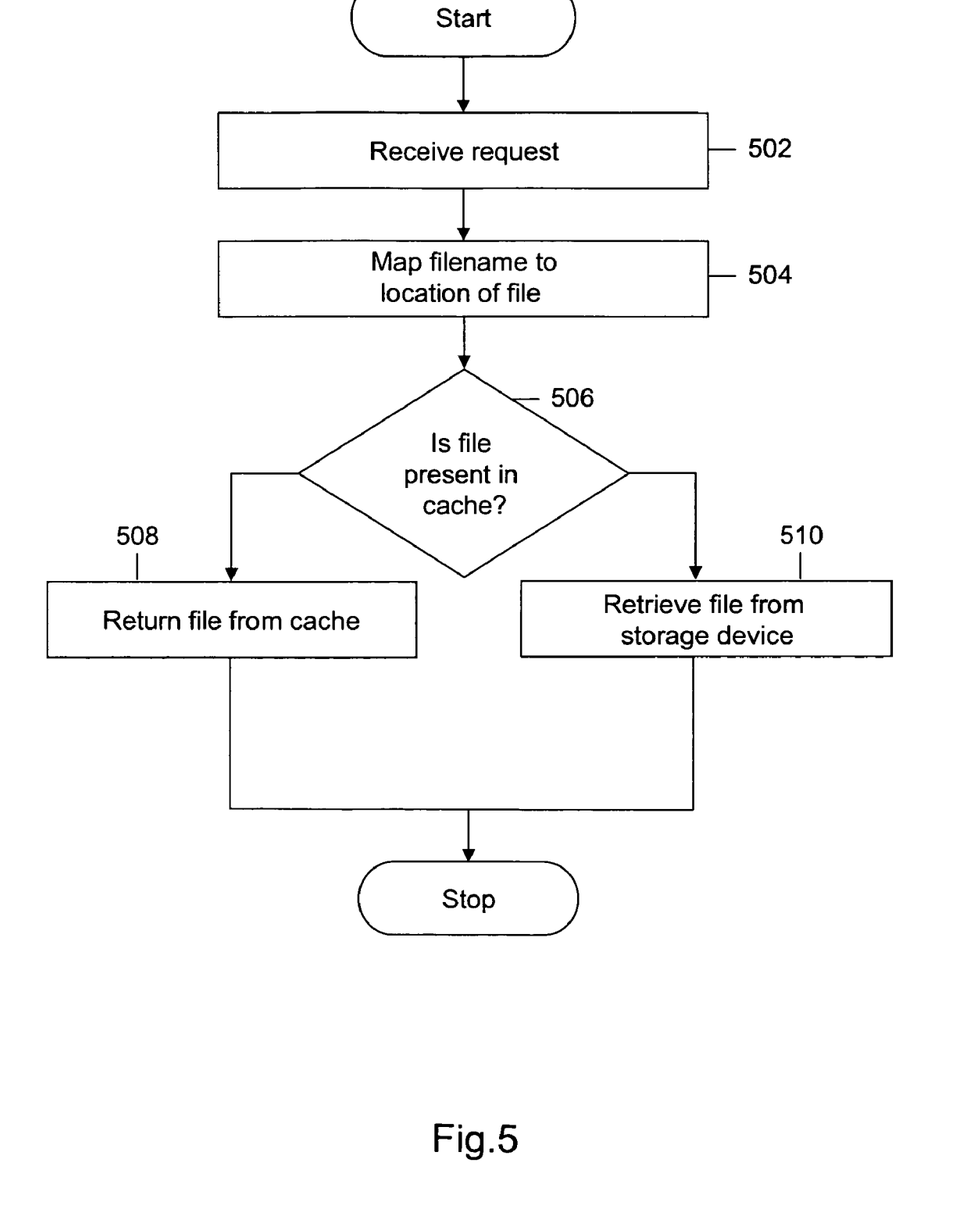
FIG. 5 is a flowchart, illustrating a method for accessing a file from a receiving computational device, in accordance with various embodiments of the invention.

FIG. 5 is a flowchart, illustrating a method for accessing the requested file from the receiving computational device, in accordance with various embodiments of the invention. At step 502, receiving module 402 receives the request for the requested file from user 202. In accordance with various embodiments, receiving module 402 receives the request in the form of the filename of a requested file. At step 504, mapping module 404 maps the filename to the location of the requested file in the receiving computational device. The mapping is performed on the basis of look-up table 302. The requested file may be located in either cache 304 or storage device 306. At step 506, it is checked if the requested file is present in cache 304. If the requested file is present in cache 304, then at step 508, returning module 406 returns the requested file from cache 304. If the requested file is not present in cache 304, then, at step 510, retrieving module 408 retrieves the requested file from storage device 306. The retrieved file is further saved in cache 304 of the receiving computational device. Therefore, for future requests the file can be accessed from cache 304, and this accelerates serving the future requests for the file.

Figure 6:
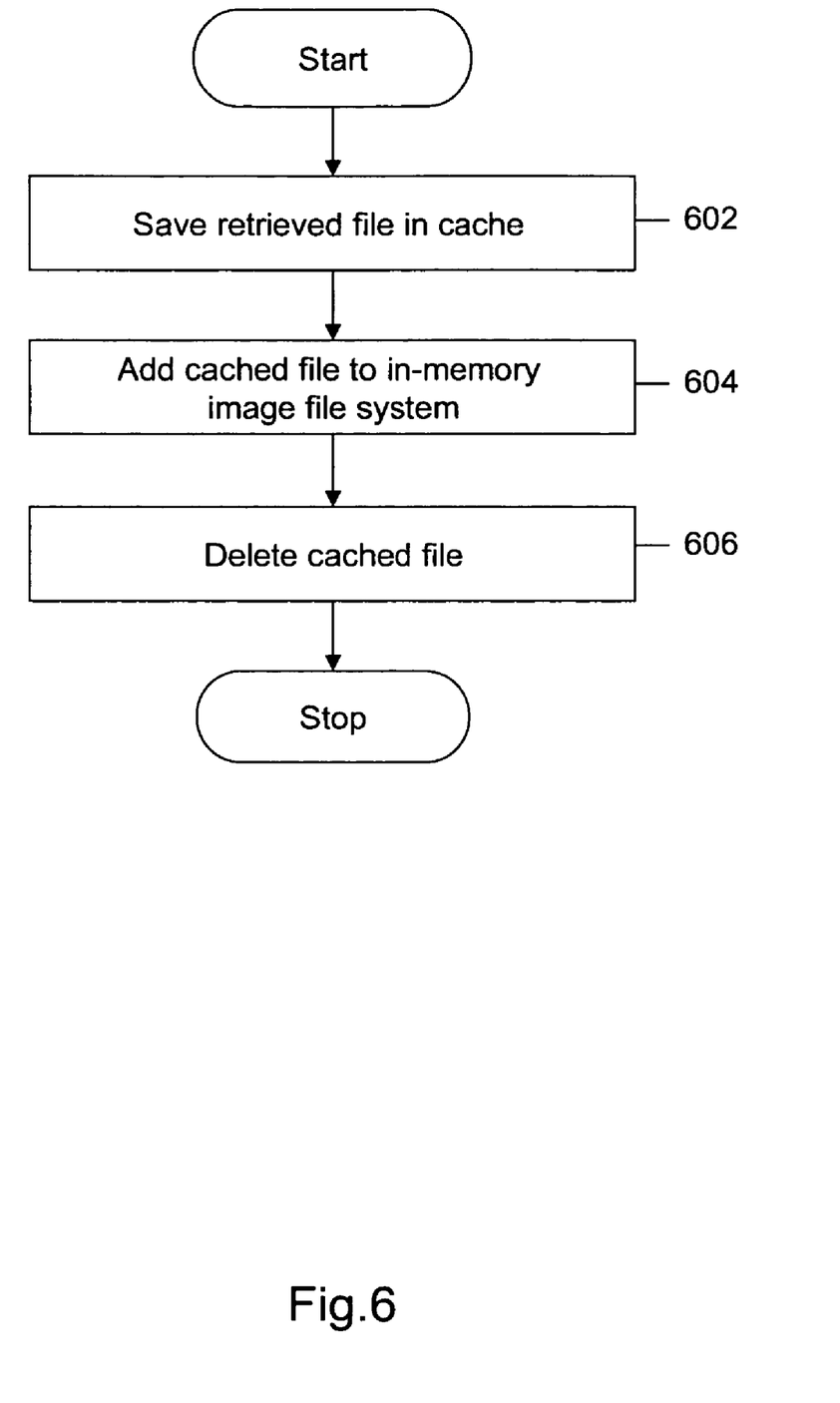
FIG. 6 is a flowchart, illustrating a method for handling the retrieved files in the receiving computational device, in accordance with various embodiments of the invention.

FIG. 6 is a flowchart, illustrating a method for handling the retrieved files in the receiving computational device, in accordance with various embodiments of the invention. At step 602, the retrieved files are saved in cache 304 of the receiving computational device by caching module 410. At step 604, the cached files can be added to an in-memory image file system, in accordance with an embodiment of the invention. The in-memory image file system is a part of IVFS 204. It is created over the cached files during the system's boot up. The in-memory image file system is based on the existing simple file system infrastructure and can be used to read the cached files from cache 304. Further, at step 606, the cached files can be deleted by deleting module 414 on the basis of the policy-based-cache-deletion mechanism. The policy-based-cache-deletion mechanism has been described with reference to FIG. 7.

Cache 304 is a part of the memory of the receiving computational device. Being a part, cache 304 has a limited memory size. This implies that cache 304 can save only a limited number of the retrieved files. Therefore, some cached files may have to be deleted from cache 304 to optimize the usage of the memory space. User 202 defines the basis on which the cached files are deleted. The deletion mechanism of the cached files depends on the availability of the cached files in storage device 306 and their importance with reference to user 202. For example, a cached file may not have a copy in storage device 306. User 202 may never want to delete the cached file from cache 304 for an easy access to the cached file. However, there can be some cached files that may be unimportant for user 202. Therefore, user 202 may want to delete these cached files from cache 304. In an embodiment of the invention, the deletion of the cached files is prevented when the receiving computational device is net booted or warm booted. The policy-based-cache-deletion mechanism therefore facilitates the optimization of the usage of the memory space provided for cache 304.

Figure 7:
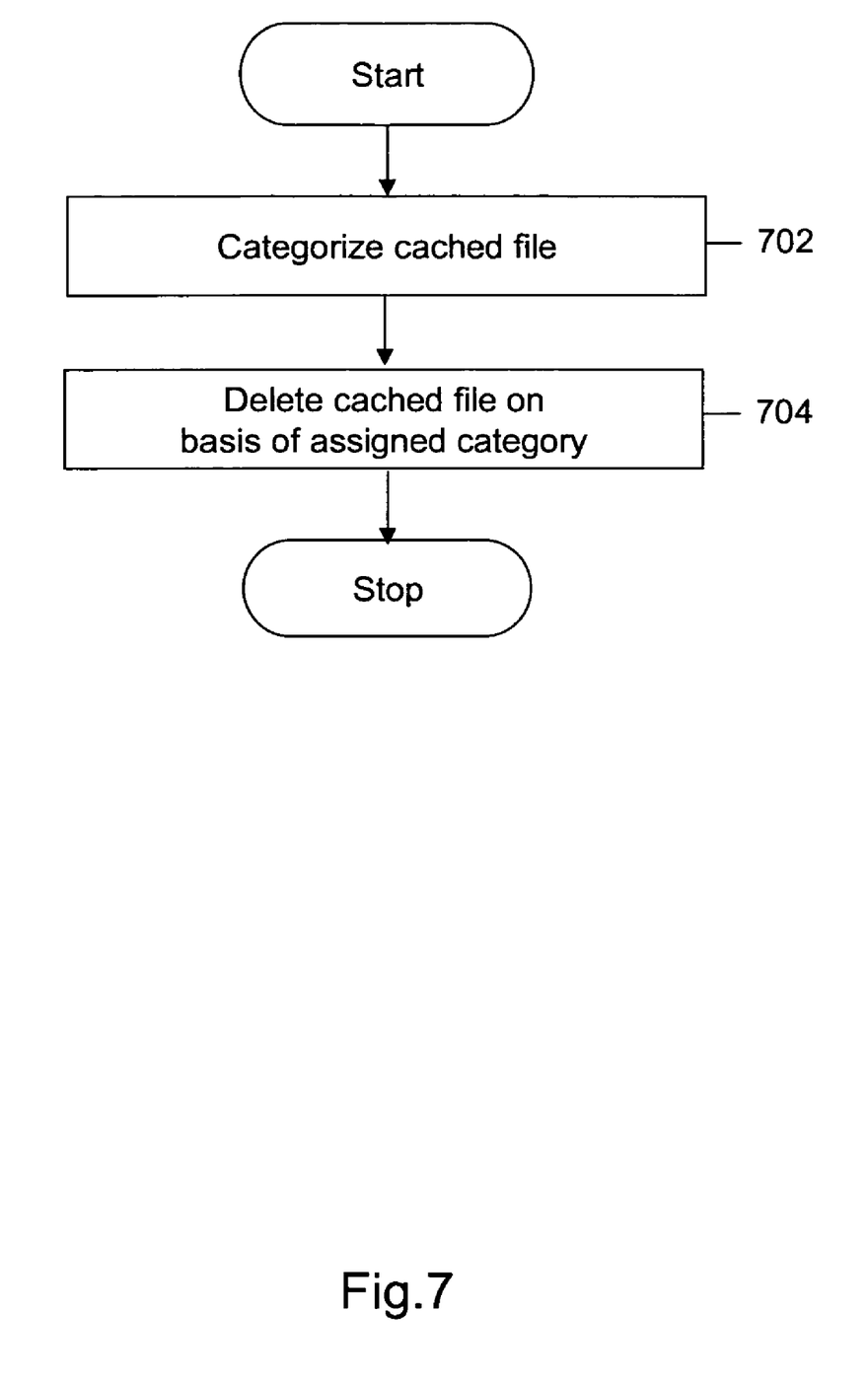
FIG. 7 is a flowchart, illustrating a method for deleting a cached file from the receiving computational device, in accordance with various embodiments of the invention.

FIG. 7 is a flowchart, illustrating a method for deleting the cached files from the receiving computational device, in accordance with various embodiments of the invention. As described earlier, the cached files can be deleted from cache 304 on the basis of the policy-based-cache-deletion mechanism. This policy-based-cache-deletion mechanism is used to delete files based on the categories assigned to the cached files. At step 702, the cached files are categorized into categories by categorizing module 412. Further, at step 704, deleting module 414 deletes the cached files from cache 304 on the basis of different categories assigned to them.

The number of categories and the definitions of the categories can be defined by user 202. For example, user 202 can specify four categories. The categories can be, for example, 'always delete', 'never delete', 'delete if a local replica is present' and 'delete if local replica is present under low-memory conditions'. Accordingly, cached files that are categorized as 'always delete', will be deleted, irrespective of any other conditions. Further, cached files that are categorized as 'never delete' will never be deleted, irrespective of any other condition. In accordance with an embodiment of the invention, user 202 can interfere with the policy-based-cache-deletion mechanism. For example, user 202 can delete a cached file that has been categorized as 'never delete'. The implementation of embodiments of the invention using these categories has been described in conjunction with FIG. 8.

Figure 8:
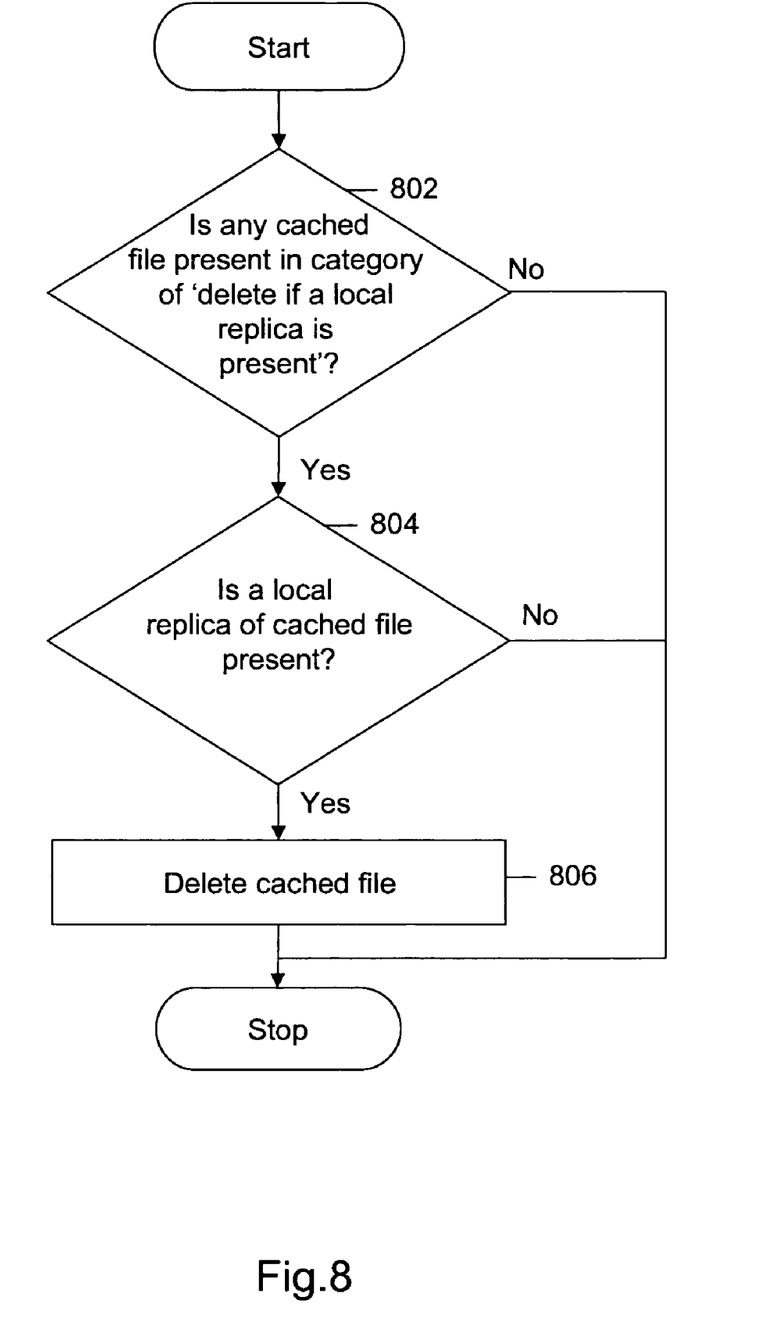
FIG. 8 is a flowchart, illustrating a method for deleting a cached file from the receiving computational device, in accordance with an embodiment of the invention.

FIG. 8 is a flowchart, illustrating a method for deleting a cached file from the receiving computational device, in accordance with an embodiment of the invention. At step 802, deleting module 414 checks if any cached file has been assigned the category of 'delete if a local replica is present'. If a cached file has been assigned the above-mentioned category, then at step 804, deleting module 414 checks if the local replica of the cached file is present in storage device 306. If the local replica is present, then at step 806, the cached file is deleted from cache 304.

Figure 9:
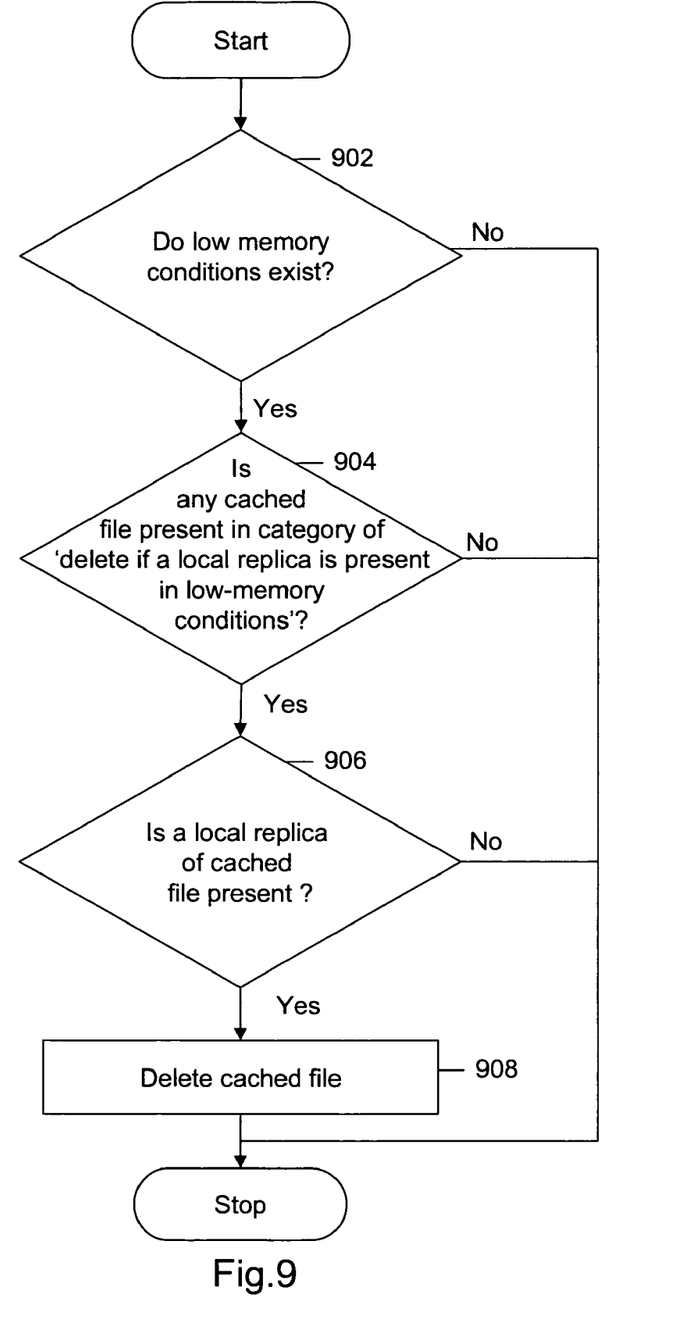
FIG. 9 is a flowchart, illustrating a method for deleting a cached file from the receiving computational device, in accordance with another embodiment of the invention.

FIG. 9 is a flowchart, illustrating a method for deleting a cached file from the receiving computational device, in accordance with another embodiment of the invention. At step 902, deleting module 414 checks if low-memory conditions exist. The low-memory conditions for the cached file exist when the free space available in cache 304 becomes less than a predefined limit. User 202 can set the predefined limit. For example, if the available free memory in cache 304 in the receiving device is low, for example, if only 2 percent of the memory of cache 304 is free, it is considered to be as a low-memory condition. If, at step 902 it is found that low-memory conditions exist, then at step 904 deleting module 414 checks if any cached file has been assigned the category of 'delete if a local replica is present under low memory conditions'. If a cached file has been assigned the above-mentioned category, then at step 906, deleting module 414 checks if the local replica of the cached file is present in storage device 306. If the local replica of the cached file is present in storage device 306, then, at step 908, the cached file is deleted from cache 304.

Various embodiments of the invention facilitate user 202 to access the requested file from either cache 304 or storage device 306, without having to know the exact location of the requested file. The location transparency is achieved by using IVFS 204, which is a file-based system.

Various embodiments of the invention can be performed without virtual memory support, as IVFS 204 is used independently of virtual memory support.

Various embodiments of the invention facilitate the file-caching capability of IVFS 204, wherein the retrieved files are cached in cache 304.

Various embodiments of the invention facilitate the optimization of usage of the memory space provided for cache 304. This space usage is optimized by saving only the required files and deleting the cached files from cache 304 on the basis of a policy-based-cache-deletion mechanism. The policy-based-cache-deletion mechanism can be user-defined.

Various embodiments of the invention facilitate the reduction of the boot-up time of the receiving computational device. This is possible, as the files are saved in cache 304 only when they are retrieved.

Various embodiments of the invention prevent the deletion of the cached files when the receiving computational device is net booted or warm booted.

Various embodiments of the invention facilitate a consistent file system interface to read the requested file from flash memory. The underlying file system interface is used to access the requested file from flash memory or storage device 306. The file system interface depends on the type of archive in which the requested file to be read is included. For example, if the archive file format is Tape Archive Format (TAR) then the file system that can recognize the TAR format is used to extract the requested file. However, if the archive is a standalone file stored in an Advanced Technology Attachment (ATA) disk, then the interface corresponds to a simple ATA file system 'open( )' call.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, JAVA™, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims

What is claimed is:

1. A method comprising:
   maintaining a look-up table that maps filenames of files to file locations in a storage device or in a cache of a receiving computational device, the maintained look-up table includes mapping information to process a file request without specifying the requested file's location, wherein the requested file is located in the storage device or in the cache of the receiving computational device;
   categorizing at least a portion of files in the cache of the receiving computational device into categories, wherein a policy defines which of the categories of the files in the cache of the receiving computational device are categorized into, wherein the categories include at least a first category and a second category, wherein files in the first category are always deleted, and wherein files in the second category are conditionally deleted;
   receiving a request for accessing a file from a user, the received request comprising the filename of the file in the received request for accessing;
   determining a mapping for the filename of the file in the received request for accessing using the maintained look-up table, wherein the received request for accessing from the user does not specify location of the file;
   returning the file specified in the received request for accessing from the cache of the receiving computational device if the determined mapping indicates the file is present in the cache of the receiving computational device; and retrieving the file specified in the received request for accessing from the storage device if the determined mapping indicates the file specified in the received request for accessing is not present in the cache of the receiving computational device.

2. The method of claim 1, wherein the retrieving the file specified in the received request from the storage device further comprises saving the retrieved file in the cache of the receiving computational device.

3. The method of claim 2 further comprising deleting the saved retrieved file using the policy, the method further comprising:
assigning one of the categories to the saved retrieved file; and
deleting the saved retrieved file on the basis of the assigned category one of the categories.

4. The method of claim 3, wherein the assigning one of the categories to the saved retrieved file comprises assigning a category selected from a group consisting of 'never delete', 'delete if a local replica present' and 'delete if a local replica present under low memory conditions'.

5. The method of claim 3 further comprising preventing deletion of the saved retrieved file when the receiving computational device is warm booted.

6. The method of claim 3 further comprising preventing deletion of the saved retrieved file when the receiving computational device is net booted.

7. The method of claim 1, wherein the mapping information comprises the filenames and the locations of the files either in the storage device or in the cache of the receiving computational device.

8. The method of claim 1, wherein at least one of the categories is never delete.

9. The device method of claim 1, wherein the categories are user-defined.

10. A computational device comprising:
a processor comprising:
logic for maintaining a look-up table that maps filenames of files to locations in a storage device or in a cache in the computational device, wherein the files from the storage device are stored in the cache in the computational device and the stored files in the cache in the computational device are deleted according to a policy;
a request receiver for receiving a request for accessing a file from a user, the received request comprising the filename of the file in the received request for accessing;
a mapping module for determining a mapping for the filename in the received request for accessing using the maintained look-up table, wherein the received request for accessing from the user does not the specify location of the file;
a categorizing module for categorizing at least a portion of the stored files in the cache in the computational device into categories, wherein a policy defines which of the categories of the files in the cache of the computational device are categorized into, wherein the categories include at least a first category and a second category, wherein files in the first category are always deleted, and wherein files in the second category are conditionally deleted;
a deleting module for deleting one or more of the categorized stored files in the cache in the computational device according to the policy;
a returning module for returning the file specified in the received request for accessing from the cache of the computational device if the determined mapping indicates, the file is present in the cache of the computational device; and
a retrieving module for retrieving the file specified in the received request for accessing from the storage device if the determined mapping indicates the file specified in the received request for accessing is not present in the cache of the computational device.

11. The computational device of claim 10, wherein the storage device comprises a local device attached to the computational device.

12. The computational device of claim 10, wherein the storage device comprises a memory of another computational device attached to the computational device through a network.

13. The computational device of claim 10, wherein the storage device comprises a local device of another computational device attached to the computational device through a network.

14. The computational device of claim 10 further comprising a caching module for saving the retrieved file specified in the received request for accessing.

15. The computational device of claim 14 further comprising a policy-based-cache-deletion mechanism to implement the policy.

16. The computational device of claim 10 further comprising a consistent file system interface for accessing files from flash memory attached to the receiving computational device.

17. The computational device of claim 10, wherein the computational device utilizes an image virtual file system that is independent of virtual memory support.

18. An apparatus comprising:
a processing system including a processor coupled to a display and a user input device;
a machine-readable storage medium including instructions executable by the processor comprising:
one or more instructions for maintaining a look-up table that maps filenames of files to file locations in a storage device and a cache of a receiving computational device, the maintained look-up table includes mapping information to process a file request without specifying the requested file's location, wherein the requested file is located in the storage device or in the cache of the receiving computational device;
one or more instructions for categorizing at least a portion of files in the cache of the receiving computational device into categories, wherein a policy defines which of the categories of the files in the cache of the receiving computational device are categorized into, wherein the categories include at least a first category and a second category, wherein files in the first category are always deleted, and wherein files in the second category are conditionally deleted;
one or more instructions for receiving a request for accessing a file from a user, the received request for accessing comprising the filename of the file in the received request for accessing, the received request for accessing being received at the receiving computational device;
one or more instructions for determining a mapping for the filename of the file in the received request for accessing using the maintained look-up table, wherein the received request for accessing from the user does not specify location of the file;
one or more instructions for returning the file specified in the received request for accessing from the cache of the receiving computational device if the determined mapping indicates the file is present in the cache of the receiving computational device; and one or more instructions for retrieving the file specified in the received request for accessing from the storage device if the determined mapping indicates the file is not present in the cache of the receiving computational device.

19. A machine-readable storage medium including instructions executable by a processor, the machine-readable storage medium comprising:

one or more instructions maintaining a look-up table that maps filenames of files to file locations in a storage device and a cache of a receiving computation device, the maintained look-up table includes mapping information to process a file request without specifying the requested file's location, wherein the requested file is located in the storage device or in the cache of the receiving computational device;

one or more instructions categorizing at least a portion of files in the cache of the receiving computational device into categories, wherein a policy defines which of the categories the of files in the cache of the receiving computational device are categorized into, wherein the categories include a first category and a second category, wherein files in the first category are always deleted, and wherein files in the second category are conditionally deleted;

one or more instructions for receiving a request for accessing a file from a user, the received request comprising the filename of the file in the received request for accessing, the received request being received at the receiving computational device;

one or more instructions for determining a mapping for the filename of the file in the received request for accessing using the maintained look-up table, wherein the received request for accessing from the user does not specify location of the file;

one or more instructions for returning the file specified in the received request for accessing from the cache of the receiving computational device if the determined mapping indicates the file is present in the cache of the receiving computational device; and one or more instructions for retrieving the file specified in the received request for accessing from the storage device if the determined mapping indicates the file specified in the received request for accessing is not present in the cache of the receiving computational device.

\* \* \* \* \*